(12) United States Patent
Cordeiro

(10) Patent No.: US 11,395,213 B2
(45) Date of Patent: **\*Jul. 19, 2022**

(54) SYSTEMS AND METHODS FOR IMPLEMENTING MULTIPLE BAND SERVICE DISCOVERY

(71) Applicant: Intel Corporation, Santa Clara, CA (US)

(72) Inventor: Carlos Cordeiro, Portland, OR (US)

(73) Assignee: INTEL CORPORATION, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/449,094

(22) Filed: Jun. 21, 2019

(65) Prior Publication Data

US 2020/0022071 A1 Jan. 16, 2020

Related U.S. Application Data

(63) Continuation of application No. 15/459,940, filed on Mar. 15, 2017, now Pat. No. 10,334,508, which is a continuation of application No. 13/682,866, filed on Nov. 21, 2012, now Pat. No. 9,635,603.

(51) Int. Cl.
*H04B 7/00* (2006.01)
*H04W 48/14* (2009.01)
(Continued)

(52) U.S. Cl.
CPC ............. *H04W 48/14* (2013.01); *H04L 67/16* (2013.01); *H04L 69/24* (2013.01); *H04W 4/00* (2013.01);
(Continued)

(58) Field of Classification Search
CPC ........ H04L 67/16; H04L 69/24; H04W 48/14; H04W 4/00; H04W 4/80; H04W 84/18; H04W 88/06
See application file for complete search history.

(56) References Cited

U.S. PATENT DOCUMENTS 9,635,603 B2 * 4/2017 Cordeiro ................. H04W 4/00
2007/0225044 A1 * 9/2007 Law ..................... H04W 74/002
455/562.1
(Continued)

*Primary Examiner* — Xin Jia
(74) *Attorney, Agent, or Firm* — Eversheds Sutherland (US) LLP

(57) ABSTRACT

A system and method are provided for implementing unique multi-band service discovery protocols between communicating devices, including wireless communicating devices supporting operations according to multiple standards and in different frequency bands, particularly in peer-to-peer or ad hoc networking schemes. The disclosed systems and methods define within each service discovery frame, whether a service discovery query or a service discovery response, an indication of the frequency band and/or channel that may support a specific service indicated by the service discovery frame. Cooperating communicating devices between which communications are to be established supporting a specific service protocol are provided with a mechanism by which to identify which common frequency bands and/or channels the communicating devices may communicate in executing the specific service.

23 Claims, 5 Drawing Sheets

(51) Int. Cl.
  *H04W 4/00* (2018.01)
  *H04L 67/51* (2022.01)
  *H04L 69/24* (2022.01)
  *H04W 84/18* (2009.01)
  *H04W 88/06* (2009.01)
  *H04W 4/80* (2018.01)

(52) U.S. Cl.
  CPC .............. *H04W 4/80* (2018.02); *H04W 84/18* (2013.01); *H04W 88/06* (2013.01)

(56) References Cited

U.S. PATENT DOCUMENTS

| | | | |
|---|---|---|---|
| 2011/0040895 A1* | 2/2011 | Griffin | H04L 67/02 709/248 |
| 2011/0213876 A1* | 9/2011 | Kumar | H04L 67/16 709/224 |
| 2011/0317569 A1* | 12/2011 | Kneckt | H04L 5/0091 370/252 |
| 2013/0148643 A1* | 6/2013 | Abraham | H04W 84/12 370/338 |
| 2013/0331031 A1* | 12/2013 | Palin | H04W 4/80 455/41.2 |
| 2014/0029596 A1* | 1/2014 | Li | H04W 8/005 370/338 |
| 2014/0314065 A1* | 10/2014 | Song | H04W 8/005 370/338 |
| 2015/0163635 A1* | 6/2015 | Leppanen | H04L 67/16 455/426.1 |

* cited by examiner

| Operating Class (Frequency band) | Channel Number | MAC Address |
|---|---|---|
| 1 | 1 | 6 |

FIG. 3

SYSTEMS AND METHODS FOR IMPLEMENTING MULTIPLE BAND SERVICE DISCOVERY

CROSS-REFERENCE TO RELATED APPLICATION

This application is a continuation of U.S. Non-Provisional application Ser. No. 15/459,940, filed Mar. 15, 2017, which is a continuation of U.S. Non-Provisional application Ser. No. 13/682,866, filed Nov. 21, 2012, now issued as U.S. Pat. No. 9,635,603 on Apr. 25, 2017, the disclosures of which are incorporated herein by reference in their entireties.

BACKGROUND

1. Field of the Disclosed Embodiments

This application is a continuation of U.S. Non-Provisional application Ser. No. 15/459,940, filed Mar. 15, 2017, which is a continuation of U.S. Non-Provisional application Ser. No. 13/682,866, filed Nov. 21, 2012, now issued as U.S. Pat. No. 9,635,603 on Apr. 25, 2017. This disclosure relates to systems and methods for implementing unique multi-band service discovery protocols between communicating devices. These communicating devices include wireless communicating devices supporting operations according to multiple standards and in different frequency bands, particularly in peer-to-peer or ad hoc networking schemes.

2. Related Art

The term "service discovery" refers to schemes that enable a first communicating device, often a wireless communicating device, to automatically discover, or "sense," the services that may be provided, or supported, by one or more second communicating devices with which the first communicating device attempts to establish communication. The first communicating device may, for example, execute one or more service discovery protocols (SDPs). SDPs are generally network communication protocols that provide for automatic detection and identification of (1) other (one or more second) communicating devices with which the communicating device may attempt to establish communication, and (2) the services offered by the other communicating devices operating in established or ad hoc communicating networks. Service discovery is conventionally understood to require a common language that may allow the individual communicating devices to make use of the other device's services without the need for continuous user intervention.

As used in this disclosure, and as is commonly understood to those of skill in the art, the term "service" is intended to refer to a single utility, or a suite of utilities, that have meaning from a point of view of a user of a communicating device. These services may include, for example, computing services, communicating services, printing services, display services, or the like. Different standards may define different services and different service discovery protocols. For example, in the Wi-Fi Alliance (WFA) peer-to-peer (P2P) specification, the following services are specified:

(1) Universal Plug and Play (UPnP), which permits networked devices, such as personal computers, printers, Internet gateways, Wi-Fi access points and mobile devices to seamlessly discover each other's presence on the network and to establish functional network services for data sharing, communication, and entertainment;

(2) Bonjour, which is an Apple proprietary implementation of zero configuration networking according to a set of techniques that automatically create a usable IP network without manual operator intervention or special configuration servers, including implementing service discovery, address assignment and hostname resolution;

(3) Web Services Dynamic Discovery (WS-Discovery), which defines a multicast discovery protocol to locate services on a local network, the communication between nodes being done using web services standards such as, for example, SOAP-over-UDP; and (4) Wi-Fi Display, which is the new standard for exchange of, for example, three-dimensional videos compressed to travel over Wi-Fi connections between devices. In addition, organizations other than the WFA have also defined services. The Wireless Gigabit (WiGig) Alliance has separately defined the WiGig Display Extension, WiGig Serial Extension, WiGig Bus Extension and WiGig SD Extension standards. Similarly, the Bluetooth Special Interest Group (SIG) has defined its own service standards.

An implementing and/or operating assumption that is common across all of these exemplary service discovery protocols, as they are currently available, is that a service, once discovered, applies to all of the frequency bands that a particular communicating device supports. This implementing assumption is illustrated in an exemplary manner with the simple communicating system 100 shown in FIG. 1. As shown in FIG. 1, Device A 110 and Device B 150 both support two frequency bands each: Band X 120,160 (e.g., 2.4 GHz) and Band Y 130,170 (e.g., 5 GHz). In the example shown in FIG. 1, Device A 110 sends a Service Discovery Query frame to Device B 150 over Band X 120. In the Service Discovery Response frame that Device A 110 receives from Device B 150, an indication is provided that Device B 150 supports, for example, Wi-Fi Display. If Device A 110 also supports Wi-Fi Display, then both devices, Device A 110 and Device B 150, can proceed to start a Wi-Fi Display session between them.

A difficulty with an implementation such as that illustrated in the example shown in FIG. 1 is that it is based on an implicit assumption, as mentioned above, that the discovered service, in this instance Wi-Fi Display, can operate over both Band X 120,160 and Band Y 130,170. This assumption has generally been considered valid for existing implementations. Today, there is an increasing proliferation of devices that heterogeneously combine operations of multiple radios. The multiple radios support disparate service systems operating according to different standards, and in different frequency ranges. As an example, WiGig systems operating in the unlicensed 60 GHz frequency band may be supported in a same communicating device housing a Wi-Fi system operating in the unlicensed 2.4 and/or 5 GHz frequency band(s). Many variations of communication technologies are being hosted on similarly appearing and seemingly similarly operating devices. The assumption, however, that a discovered service is supportable by one or all of the radios in a particular device is becoming less likely to be valid as specified non-cooperating devices host differing applications and services. In particular, it is becoming generally recognized that the set of services supported by 60 GHz capable radios, for example, will likely not fully coincide with the set of services supported by other band communication radios that may be supported by the same communicating device. In other words, in the example illustration depicted in FIG. 1, and as discussed above, while Wi-Fi Display is a service supported over Band X 120,160, there is no guarantee that the conventional assumption that Wi-Fi Display as a service will also necessarily be supported over Band Y 130,170 in instances where Band Y 130,170 is a 60 GHz frequency band.

In short, some services will likely be unique to only certain bands. This will represent a departure from devices as they are made available today. Generally, conventional multi-radio devices employ the Internet as the default universal translator for supporting different services on different bands. Multi-radio protocols will soon remove the Internet from a particular communication scheme between cooperating devices. Services are being developed that are device centric and that may be exchanged between communicating devices directly. These services will not pass through the Internet or some other intermediary service that may be accessed via some wireless access point, for example. A simple example may involve downloading video files from a wireless handheld communicating device directly to a user's television for display.

BRIEF DESCRIPTION OF THE DRAWINGS

Various exemplary embodiments of the disclosed systems and methods for implementing unique multi-band service discovery protocols between communicating devices according to this disclosure will be described, in detail, with reference to the following drawings, in which:

FIG. 3 illustrates an exemplary frame format of the fields that may be included in any frame that is meant to enable multi-band service discovery according to this disclosure;

DETAILED DESCRIPTION OF THE DISCLOSED EMBODIMENTS

Figure 1:
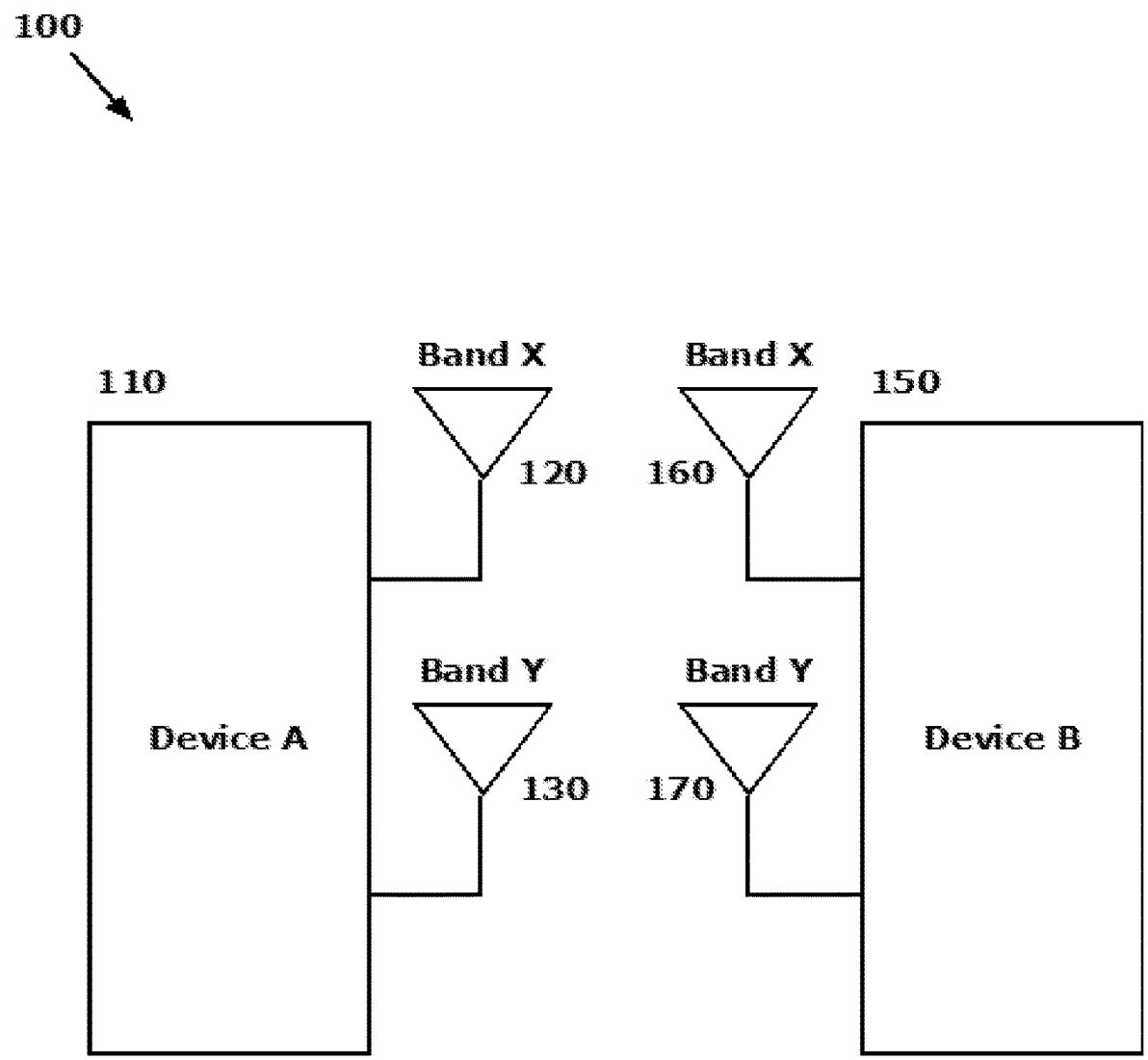
FIG. 1 illustrates a schematic representation of implementing assumptions according to existing service discovery protocol schemes.

The disclosed systems and methods for implementing unique multi-band service discovery protocols between communicating devices according to this disclosure, will generally refer to this specific utility for those systems and methods. Exemplary embodiments described and depicted in this disclosure should not be interpreted as being specifically limited to applicability to any particular communication standard or to communications in any particular frequency bandwidth. The disclosed systems and methods may find applicability in implementations of at least IEEE 802.11 standard communications, as well as WiGig standard communications, Bluetooth standard communications, cellular standard communications and the like.

Specific reference, for example, to any particular wireless device, whether generally static or mobile, should be understood as being exemplary only, and not limited, in any manner, to any particular class of wireless devices, transmitters or receivers. The systems and methods according to this disclosure will be described as being particularly adaptable to heterogeneous multi-radio wireless communicating devices. This adaptation for the systems and methods according to this disclosure is intended to be exemplary only, and in no way limiting to the disclosed subject matter.

Individual features and advantages of the disclosed systems and methods will be set forth in the description that follows, and will be, in part, obvious from the description, or may be learned by practice of the features described in this disclosure. The features and advantages of the systems and methods according to this disclosure may be realized and obtained by means of the individual elements, and combinations of those elements, as particularly pointed out in the appended claims. While specific implementations are discussed, it should be understood that this is done for illustration purposes only. A person skilled in the relevant art will recognize that other components and configurations may be used without departing from the spirit and scope of the subject matter of this disclosure.

In view of the above-identified shortfalls in conventional service discovery protocols, it would be advantageous to implement a scheme for multi-band service discovery between operating communicating devices.

Exemplary embodiments of the disclosed systems and methods may define that each service discovery frame transmitted between communicating devices may include an indication of the frequency band and channel that may support the services indicated by the service discovery frame. The service discovery frame may be a service discovery query or a service discovery response.

Exemplary embodiments may expand on current capabilities in which cellular communicating devices may heterogeneously incorporate Wi-Fi radios operating in the 2.4 and 5 GHz frequency bands. Exemplary devices may facilitate local direct communications between communicating devices, including avoiding the need to pass through the Internet.

Exemplary embodiments may match service availability with an indication of supported communicating channels or bands in cooperating communicating devices. This matching may facilitate and/or optimize provision of a particular service directly between those cooperating communicating devices.

Exemplary embodiments may facilitate communications directly between cooperating communicating devices without reference to any base station or access point. Exemplary schemes may identify common channels or frequency bands that the cooperating communicating devices may use to conduct communications of a particular service. The particular service may be supported by only a subset of the available channels or frequency bands that may be available in either or both of the cooperating communicating devices for conducting direct communications between devices.

These and other features, and advantages, of the disclosed systems and methods are described in, or apparent from, the following detailed description of exemplary embodiments.

Referring back to the example illustrated in FIG. 1, Device B 150 may be caused to include in a Service Discovery Response frame to Device A 110 an indication that the exemplary Wi-Fi Display service is supported only over Band X 120,160, only over Band Y 130,170, or over both (all) bands. Similarly, in its Service Discovery Query frame transmitted to Device B 130, Device A 110 may also include an indication of supported frequency band(s) and channel(s). In this manner, the included information may indicate that Device A 110 is requesting from Device B 130 a responsive indication as to which services Device B 130 may support over the specified frequency band(s) and channel(s).

Figure 2:
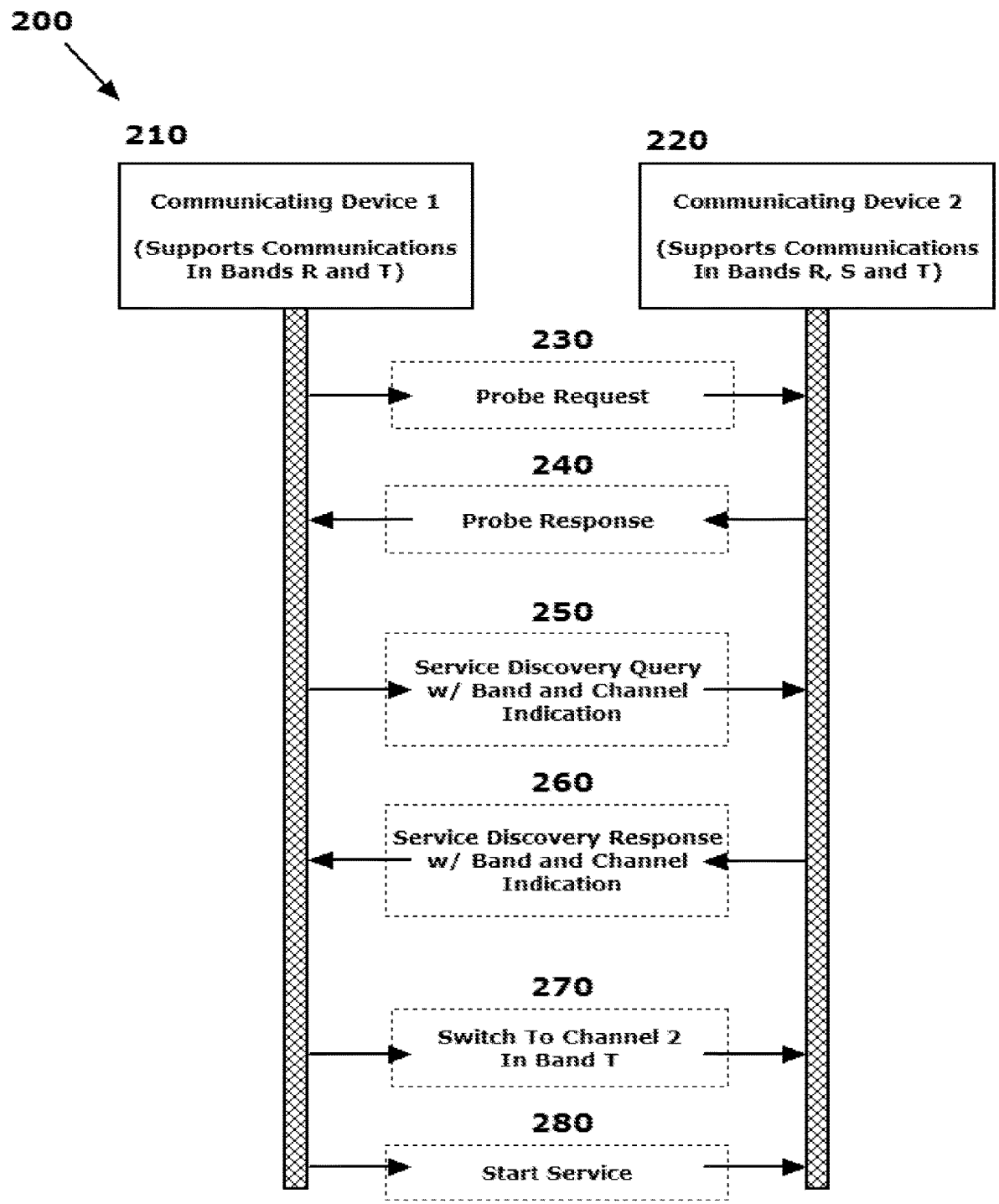
FIG. 2 illustrates a schematic representation of a multi-band service discovery protocol according to this disclosure.

FIG. 2 illustrates a schematic representation of a multi-band service discovery protocol 200 according to this disclosure. In the exemplary embodiment illustrated in FIG. 2, communicating device 1 210, which may be a peer-to-peer (P2P) communicating device, may emanate a probe request 230. Communicating device 2 220 may respond with a probe response 240. These steps will allow for discovery of communicating device 2 220 by communicating device 1 210.

Following the discovery of communicating device 2 220, communicating device 1 210 may proceed to discover the services available in, and supported by, communicating device 2 220. In the example shown in FIG. 2, communicating device 1 210 may only support communicating on bands R and T. A service discovery query frame 250 may be transmitted from communicating device 1 210 to communicating device 2 220. The service discovery query frame 250 may be used to specify that it only pertains to services that communicating device 2 220 supports over communicating bands R and T. In other words, communicating device 2 220 in a service discovery response frame 260 does not report back to communicating device 1 any service that cannot be operated over communicating bands R and T. In particular, communicating device 2 220 does not include in the service discovery response frame 260 services that can only operate over communicating band S.

Upon reception of the service discovery response frame 260 that contains the services supported by communicating device 2 220 over communicating bands R and T, communicating device 1 210 decides to start a common communication service with communicating device 2 220 over communicating band T. Following the multi-band service discovery according to the above scheme, communicating device 1 210 sends signaling 270 to communicating device 2 220 that the service will be initiated over communicating band T. Service 280 may then be commenced with both communicating device 1 210 and communicating device 2 220 cooperatively communicating according to the service over communicating band T.

It should be recognized that the disclosed scheme, as discussed above, is flexible enough to determine which of several available communicating bands each of several potential communicating devices supports. The disclosed scheme is also flexible enough to establish communications between respective pairs of communicating devices according to those determinations for the identified services. In the example of FIG. 2, the service discovery frames 250,260 are exchanged in a specific communicating channel/band, such as, for example, common communicating band R. It should be noted that the service discovery frames 250,260 can actually be transmitted in any channel and band as long as both communicating device 1 210 and communicating device 2 220 are operating to receive the transmitted frames.

FIG. 3 illustrates an exemplary frame format 300 of the fields that may be included in any frame that is meant to enable multi-band service discovery. As shown in FIG. 3, the operating class 310, channel number 330 and MAC address 350 may be specified. Inclusion of this frequency band and/or channel information in a frame indicates that the service capabilities signaled by the frame are applicable to the service noted.

As can be seen from the depiction in FIGS. 2 and 3, and the above description, the proposed scheme for multi-band service discovery allows one communicating device to discover the services of another communicating device in any communicating band. These techniques will enable a new generation of multi-band capable communicating devices. These devices may be capable of requesting and/or advertising different service capabilities in different communicating bands between pairs of communicating devices.

Figure 4:
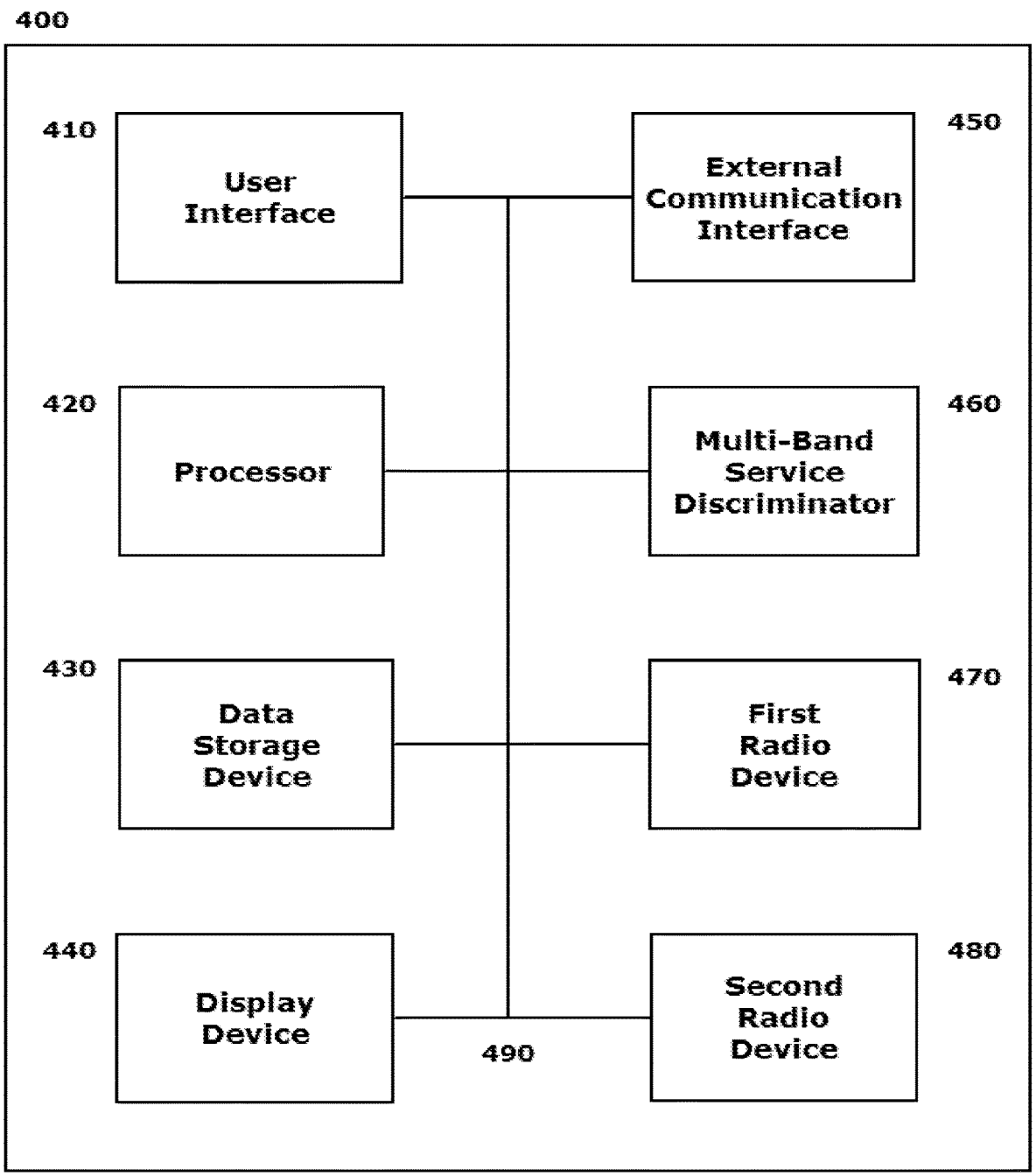
FIG. 4 illustrates a block diagram of an exemplary system for implementing a multi-band service discovery protocol according to this disclosure.

FIG. 4 illustrates a block diagram of an exemplary system 400 for implementing a multi-band service discovery protocol according to this disclosure.

The exemplary system 400 may include a user interface 410 by which the user can communicate with the exemplary system 400, and initiate operations of the exemplary system 400 for multi-band service discovery. The process of multi-band service discovery may be initiated by operation of one or more radio devices 470,480 that may be included in the exemplary system 400 or with which the exemplary system 400 may be associated. The user interface 410 may be configured as one or more conventional mechanisms that permit a user to input information to the exemplary system 400. The user interface 410 may include, for example, an integral keyboard, or a touchscreen with "soft" buttons for communicating commands and information to the exemplary systems 400, particularly when the system is housed, for example in a portable wireless communicating device. The user interface 410 may alternatively include a microphone by which a user may provide oral commands to the exemplary system 400 to be "translated" by a voice recognition program or otherwise. The user interface 410 may otherwise include any other like device for user operation of, and data exchange with, the exemplary system 400. A user may make inputs via the user interface 410 to simply turn the exemplary system 400, or one or more radios 470,480, ON thereby initiating a communication and multi-band service discovery protocol process or scheme for the exemplary system 400.

The exemplary system 400 may include one or more local processors 420 for individually undertaking the processing and control functions that are carried out by the exemplary system 400. Processor(s) 420 may include at least one conventional processor or microprocessor that interprets and executes instructions. The processor(s) 420 may process outgoing and incoming signals via the different communication links, including one or more radios 470,480 associated with the exemplary system 400. This signal processing may facilitate the detailed multi-band service discovery protocol process or scheme according to the disclosed methods.

The exemplary system 400 may include one or more data storage devices 430. Such data storage device(s) 430 may be used to store data, and operating programs or applications to be used by the exemplary system 400, and specifically the processor(s) 420. Data storage device(s) 430 may include a random access memory (RAM) or another type of dynamic storage device that stores information and instructions for execution by the processor(s) 420. Data storage device(s) 430 may also include a read-only memory (ROM), which may include a conventional ROM device or another type of static storage device that stores static information and instructions for execution by the processor(s) 420. The data storage device(s) 430 will generally be those that are integral to the exemplary system 400. Otherwise, the data storage device(s) 430 may include a remote data storage device external to the exemplary system 400 that is in wireless communication with the exemplary system 400. At least one of the data storage devices may be usable to store identifying data regarding the communicating band capabilities of, and the service protocols supported by, the exemplary system 400 or another communicating device with which the exemplary system 400 may be associated. The identifying data may be used to facilitate the initial service discovery between cooperating communicating devices. An exemplary frame format such as that shown in FIG. 3 may be populated with the data appropriate to either or both of a service discovery query or a service discovery response in the manner discussed above.

The exemplary system 400 may include at least one data display device 440, which may be configured as one or more conventional mechanisms that display information to the user of the exemplary system 400. The displayed information may be used by the user to facilitate operation of the exemplary system 400 in its various operating modes, or otherwise for displaying, for example, usable information on a resolved service protocol, as may be appropriate.

The exemplary system 400 may include an external data communication interface 450 by which the exemplary system 400 may communicate with component elements of the exemplary system 400 that are not integral to a single device, such as, for example, a portable wireless communicating device that may house most of the other elements of the exemplary system 400.

The exemplary system 400 may include a multi-band service discriminator 460. The multi-band service discriminator 460 may be a specific component that may operate in conjunction with the processor(s) 420 and/or that may use information, such as data, stored in the data storage device(s) 430. Otherwise, the multi-band service discriminator 460 may operate more autonomously according to stored information and/or internal programming in the multi-band service discriminator 460 itself. The multi-band service discriminator 460 may alternatively be a function of at least one of the processor(s) 420. The multi-band service discriminator 460 may be used to format signals to be transmitted as service discovery request frames and/or to interpret signals that are received as service discovery response frames for executing the multi-service discovery protocols according to the disclosed schemes.

The exemplary system 400 may include a first radio 470 that is configured to operate according to one standard, and in one or more frequency bands. The exemplary systems 400 may include at least one second radio 480 that is configured to operate according to another standard, and in one or more of the same or separate frequency bands from the first radio 470. The multi-band frequency discriminator 460 may be usable to establish service communications with one or more communicating devices by establishing service capabilities between the first radio 470 and/or the at least one second radio 480, and the one or more communicating devices. It should be recognized that the use of a single multi-band service discriminator 460 provides efficiencies in execution of the multi-service discovery protocol process described above. The single multi-band service discriminator 460 may be applied to one or more radios which the exemplary system 400 may include, or with which the exemplary system may be associated to heterogeneously combine communications for radios operating in different frequency bands and according to different standards.

All of the various components of the exemplary system 400, as depicted in FIG. 4, may be connected by one or more data/control busses 490. The data/control bus(ses) 490 may provide internal wired or wireless communication between the various components of the exemplary system 400, as all of those components are housed integrally in the exemplary system 400, or are housed separately and in wired or wireless communication with the exemplary system 400.

It is anticipated that the various disclosed elements of the exemplary system 400 may be arranged in combinations of sub-systems as individual components or combinations of components. All of the depicted components may be integral to a single unit that is exemplary system 400, and includes one or more radios 470,480. Otherwise, individual components, or combinations of components, may be separately presented and in wired or wireless communication with other of the individual components of the exemplary system 400, or with the one or more radios 470,480. In other words, no specific configuration as an integral unit including one or more radios or as a separate support unit associated with wireless communications using one or more radios for the exemplary system 400 is to be implied by the depiction in FIG. 4.

Figure 5:
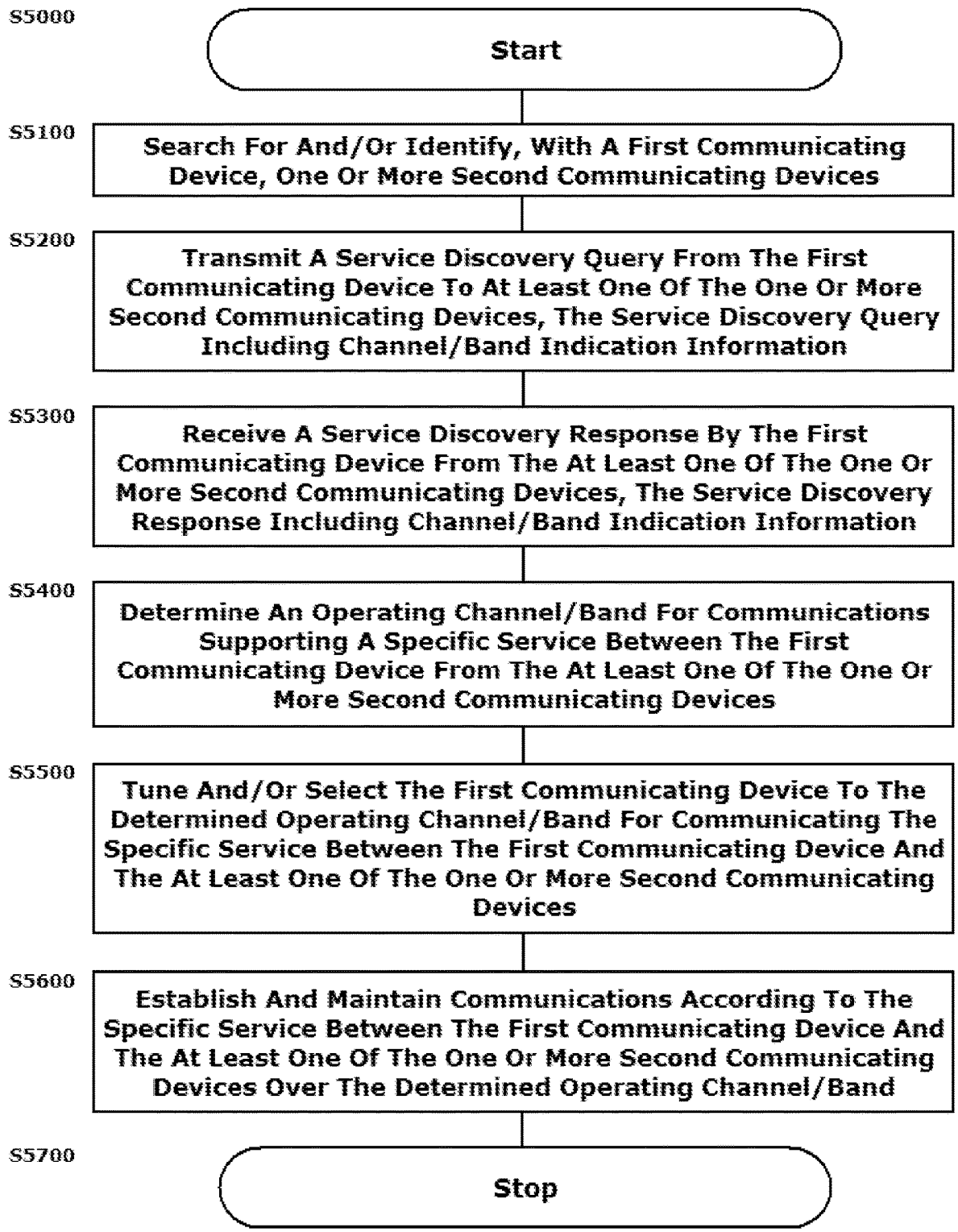
FIG. 5 illustrates a flowchart of an exemplary method for implementing a multi-band service discovery protocol according to this disclosure.

The disclosed embodiment may include an exemplary method for implementing a multi-band service discovery protocol. FIG. 5 illustrates a flowchart of such an exemplary method. As shown in FIG. 5, operation of the method commences at Step S5000 and proceeds to Step S5100.

In Step S5100, a first communicating device may search for or identify one or more second communicating devices with which the first communicating device may establish communications. Operation of the method proceeds to Step S5200.

In Step S5200, following discovery of the one or more second communicating devices by the first communicating device, a service discovery query may be formatted to be transmitted from the first communicating device to the one or more second communicating devices. The service discovery request may include channel and/or band indication information regarding the channels and/or bands that the first communicating device supports. Operation of the method proceeds to Step S5300.

In Step S5300, the first communicating device may receive a service discovery response from the one or more second communicating devices. The service discovery response may include available services information that may be supplemented by responsive channel and/or band indication information. Operation of the method proceeds to Step S5400.

In Step S5400, based on the received information regarding available services and supported channels and/or bands, the first communicating device may determine an operating channel and/or band via which to conduct communications using a selected specific service. Operation of the method proceeds to Step S5500.

In Step S5500, the first communicating device may be adjusted in a manner that tunes a transmitter, or may be adjusted in a manner that selects one of a plurality of discrete transmitters. The adjusting may be according to the determined operating channel and/or band to commence communications of the specific service between the first communicating device and the one or more second communicating devices. Operation of the method proceeds to Step S5600.

In Step S5600, communications may be established and maintained between the first communicating device and the one or more second communicating devices according to the specific service and over the determined operating channel and/or band. Operation of the method proceeds to Step S5700, where operation of the method ceases.

The disclosed embodiments may include a non-transitory computer-readable medium storing instructions which, when executed by a processor, may cause the processor to execute the steps of a method as outlined above.

The above-described exemplary systems and methods reference certain conventional "known" methods or components to provide a brief, general description of suitable communication and processing environments in which the subject matter of this disclosure may be implemented for familiarity and ease of understanding. Although not required, embodiments of the disclosure may be provided, at least in part, in a form of hardware circuits, firmware or software computer-executable instructions. Exemplary embodiments may carry out the specific functions described, including as program modules to be executed by a processor that may execute the disclosed scheme for implementing a multi-band service discovery protocol. Generally, program modules are understood to include routine programs, objects, components, data structures, and the like that perform particular tasks or implement particular data types in support of a specific function such as the disclosed implementing function.

Those skilled in the art will appreciate that other embodiments of the disclosed subject matter may be practiced in communication environments according to established networks and/or ad hoc networks. The disclosed subject matter may be practiced in peer-to-peer communications established to execute specified data exchange or cooperative application execution for a specified period of time. The disclosed communication schemes may be executed with many types of communicating devices These communicating devices may include, but are not limited to, wireless devices, wireless access points, wireless transmitters, and wireless receivers. These communicating schemed may be used with many different fixed, semi-fixed, or mobile classes and configurations of communication equipment and/or computing systems.

Embodiments may be practiced in distributed network communication environments where tasks are performed by local processing systems and devices, generally as outlined above. Some components may be linked to each other by hardwired links, wireless links, or a combination of the two through a cooperating communication network. In a distributed network environment, program modules, and any stored data or programs, may be located in both local and remote data storage devices.

As indicated briefly above, embodiments according to this disclosure may also include computer-readable media having stored computer-executable instructions or data structures recorded thereon. These recorded instructions or data structures may be accessed, read and executed by a particular module or device, or system, in, for example, a mobile or fixed wireless communicating device. Such computer-readable media can be any available media that can be accessed by a processor in, or in communication with, such a wireless device executing a service discovery protocol for multi-band service discovery as outlined above. By way of example, and not limitation, such computer-readable media can comprise RAM, ROM, EEPROM, CD-ROM, DVD-ROM, flash drives, thumb drives, data memory cards or other analog or digital data storage devices that can be used to carry or store desired program elements or steps in the form of accessible computer-executable instructions and/or data structures. When information is transferred or provided over a network or another communications connection the receiving processor properly views the connection as a computer-readable medium. Thus, any such connection is properly termed a computer-readable medium. Combinations of the above should also be included within the scope of the computer-readable media for the purposes of this disclosure.

Computer-executable instructions include, for example, non-transitory instructions and data that can be executed and accessed respectively to cause communicating components, including wireless communicating components, or processors associated with such components, to perform certain of the above-specified functions, individually or in combination. Computer-executable instructions also include program modules that are remotely stored for access by a communicating device or system to be executed by processors in the communicating device or system when the communicating device or system is caused to communicate across any available communication link, particularly those described in exemplary manner above.

The exemplary depicted sequence of executable instructions, or associated data structures for executing those instructions, represents one example of a corresponding sequence of acts for implementing the functions described in the steps. The steps of the method, as depicted in FIG. 5, are not intended to imply that all of the depicted and described steps must be executed as part of a complete method, or that the steps must be executed in any particular order, except as may be necessarily inferred when one of the depicted and described steps is a necessary precedential condition to accomplishing another of the depicted and described steps. The depicted and described steps, where appropriate, may be executed in series or in parallel.

Although the above description may contain specific details, these details should not be construed as limiting the claims in any way. Other configurations of the described embodiments of the disclosed systems and methods are part of the scope of this disclosure. For example, the principles of the disclosure may be applied to each individual communicating device where each individual communicating device may independently operate according to the disclosed system constraints or method steps. This enables each user of a separate communicating device to use the benefits of the disclosure even if any one of the large number of possible applications do not need a specific aspect of the functionality described and depicted in this disclosure. In other words, there may be multiple instances of the separate communicating devices each processing signal content in various possible ways to effect the disclosed multi-band service discovery protocol techniques, schemes, processes and methods. The disclosed system does not necessarily need to be one single system, networked or otherwise, used by all end users or undertaken identically by each communicating device or system. Accordingly, the appended claims and their legal equivalents should only define the disclosure, rather than any of the specific examples given.

I claim:

1. A wireless communication device that supports multi-band service discovery, comprising:
   at least one memory that stores computer-executable instructions; and
   at least one processor configured to access the at least one memory, wherein the at least one processor is configured to execute the computer-executable instructions to:
   generate a service discovery request frame for a Wi-Fi peer-to-peer service discovery process using a first frequency band of 2.4 GHz or 5 GHz, the service discovery request frame comprising a first indication of a requested Wi-Fi peer-to-peer service and a second indication that a 60 GHz frequency band and the first frequency band support the requested Wi-Fi peer-to-peer service;
   cause to send the service discovery request frame using the first frequency band;
   identify a service discovery response frame received from a service provider device, the service discovery response frame comprising a third indication that the service provider device provides the requested Wi-Fi peer-to-peer service and a fourth indication that the service provider device supports the requested Wi-Fi peer-to-peer service using the 60 GHz frequency band, wherein the service discovery response frame indicates that a communication session associated with the requested Wi-Fi peer-to-peer service may be established using the 60 GHz frequency band; and establish the communication session with the service provider device using the 60 GHz frequency band based on the 60 GHz frequency band being indicated in the service discovery request frame and in the service discovery response frame.

2. The wireless communication device of claim 1, wherein the 60 GHz frequency band is in accordance with a Wireless Gigabit Alliance (WiGig) standard.

3. The wireless communication device of claim 1, wherein the service discovery request frame includes a fifth indication of at least one of an operating class or a channel number.

4. The wireless communication device of claim 1, wherein the at least one processor is configured to execute the computer-executable instructions to:

determine a first radio from two or more radios of the wireless communications device that corresponds to the 60 GHz frequency band; and cause to tune the first radio to a frequency within the 60 GHz frequency band.

5. The wireless communication device of claim 1, wherein the service discovery response frame includes a fifth indication that a second frequency band supports the requested Wi-Fi peer-to-peer service and supports a second Wi-Fi peer-to-peer service.

6. The wireless communication device of claim 1, wherein the communication session is a Wi-Fi peer-to-peer communication session.

7. The wireless communication device of claim 1, wherein the service discovery request frame further comprises a Media Access Control (MAC) address for the wireless communication device.

8. The wireless communication device of claim 1, wherein the at least one processor is configured to execute the computer-executable instructions to:

cause to send a Wi-Fi probe request; and identify a Wi-Fi probe response received from the service provider device, wherein to cause to send the service discovery request frame is based on identifying the Wi-Fi probe response.

9. The wireless communication device of claim 1, wherein the service discovery response frame further comprises a fifth indication of a second frequency band, and wherein the at least one processor is configured to execute the computer-executable instructions to select the second frequency band for the requested Wi-Fi peer-to-peer service.

10. The wireless communication device of claim 1, wherein the service discovery request frame is sent according to one of an Universal Plug and Play (UPnP) protocol, a Bonjour protocol, a Web-Services Dynamic Discovery (WS-Discovery) protocol or a Wi-Fi display protocol.

11. The wireless communication device of claim 1, further comprising a transceiver configured to transmit and receive wireless signals.

12. The wireless communication device of claim 11, further comprising one or more antennas coupled to the transceiver.

13. A method for multi-band service discovery, comprising:

generating a service discovery request frame for a Wi-Fi peer-to-peer service discovery process using a first frequency band of 2.4 GHz or 5 GHz, the service discovery request frame including a first indication of a requested Wi-Fi peer-to-peer service and a second indication that a 60 GHz frequency band and the first frequency band support the requested Wi-Fi peer-to-peer service;

causing to send the service discovery request frame using the first frequency band;

identifying a service discovery response frame received from a service provider device, the service discovery response frame including a third indication that the service provider device provides the requested Wi-Fi peer-to-peer service and a fourth indication that the service provider device supports the requested Wi-Fi peer-to-peer service using the 60 GHz frequency band, wherein the service discovery response frame indicates that a communication session associated with the requested Wi-Fi peer-to-peer service may be established using the 60 GHz frequency band; and establishing the communication session with the service provider device using the 60 GHz frequency band based on the 60 GHz frequency band being indicated in the service discovery request frame and in the service discovery response frame.

14. The method of claim 13, wherein the 60 GHz frequency band is in accordance with a Wireless Gigabit Alliance (WiGig) standard.

15. The method of claim 14, further comprising:

causing to send a Wi-Fi probe request; and identifying a Wi-Fi probe response received from the service provider device, wherein causing to send the service discovery request frame is based on identifying the Wi-Fi probe response.

16. The method of claim 13, wherein the service discovery request frame further comprises a fifth indication of at least one of an operating class or a channel number.

17. The method of claim 13, wherein the communication session is a peer-to-peer communication session.

18. The method of claim 13, wherein the service discovery request frame further comprises a MAC address for a wireless communication device.

19. A non-transitory computer-readable medium storing computer-executable instructions that, when executed by at least one processor, configure the at least one processor to perform operations comprising:

generating a service discovery request frame for a Wi-Fi peer-to-peer service discovery process using a first frequency band of 2.4 GHz or 6 GHz, the service discovery request frame comprising a first indication of a requested Wi-Fi peer-to-peer service and a second indication that a 60 GHz frequency band and the first frequency band support the requested Wi-Fi peer-to-peer service;

causing to send the service discovery request frame using the first frequency band;

identifying a service discovery response frame received from a service provider device, the service discovery response frame comprising a third indication that the service provider device provides the requested Wi-Fi peer-to-peer service and a fourth indication that the service provider device supports the requested Wi-Fi peer-to-peer service using the 60 GHz frequency band, wherein the service discovery response frame indicates that a communication session associated with the requested Wi-Fi peer-to-peer service may be established using the 60 GHz frequency band; and establishing the communication session with the service provider device using a frequency within the 60 GHz frequency band based on the 60 GHz frequency band being indicated in the service discovery request frame and in the service discovery response frame.

20. The computer readable medium of claim 19, wherein the 60 GHz frequency band is in accordance with a Wireless Gigabit Alliance (WiGig) standard.

21. The computer readable medium of claim 20, the at least one processor further configured to perform operations comprising:

causing to send a probe request; and identifying a probe response received from the service provider device, wherein causing to send the service discovery request frame is based on identifying the probe response.

22. The computer readable medium of claim 19, wherein the service discovery request frame includes a fifth indication of at least one of an operating class or a channel number.

23. The computer readable medium of claim 19, wherein the service discovery request frame further comprises a MAC address for a wireless communication device.

\* \* \* \* \*